(12) United States Patent
Inoue et al.

(10) Patent No.: US 6,776,462 B2
(45) Date of Patent: Aug. 17, 2004

(54) ANTI-SKID CONTROL SYSTEM AND METHOD FOR AUTOMOTIVE VEHICLE

(75) Inventors: Gen Inoue, Kanagawa (JP); Nobuyuki Ohtsu, Kanagawa (JP); Atsushi Ishikawa, Kawasaki (JP)

(73) Assignee: Unisia Jecs Corporation, Atsugi (JP)

( * ) Notice: Subject to any disclaimer, the term of this patent is extended or adjusted under 35 U.S.C. 154(b) by 144 days.

(21) Appl. No.: 10/102,006

(22) Filed: Mar. 21, 2002

(65) Prior Publication Data

US 2003/0062771 A1 Apr. 3, 2003

(30) Foreign Application Priority Data

Mar. 21, 2001 (JP) ........................................ 2001-080263

(51) Int. Cl.[7] .............................................. B60T 8/72
(52) U.S. Cl. ...................................... 303/171; 303/158
(58) Field of Search ................................ 303/171, 172, 303/173, 157, 158

(56) References Cited

U.S. PATENT DOCUMENTS

| 5,435,635 A | * | 7/1995 | Watanabe .................... 303/170 |
| 5,559,702 A | * | 9/1996 | Kojima et al. ............... 303/170 |
| 5,799,261 A | * | 8/1998 | Ozaki et al. ................. 303/171 |
| 6,292,733 B1 | * | 9/2001 | Sugiyama et al. ............ 701/76 |

FOREIGN PATENT DOCUMENTS

JP 7-117653 5/1995

OTHER PUBLICATIONS

U.S. patent application Ser. No. 10/101,379, Ohtsu, filed Mar. 20, 2002.
U.S. patent application Ser. No. 10/122,319, Ishikawa et al., filed Apr. 16, 2002.
U.S. patent application Ser. No. 10/127,559, Ishikawa et al., filed Apr. 23, 2002.

* cited by examiner

Primary Examiner—Robert A. Siconolfi
(74) Attorney, Agent, or Firm—Foley & Lardner

(57) ABSTRACT

In anti-skid control system and method for an automotive vehicle, when a calculated wheel deceleration of any one of road wheels of the vehicle has reached to a predetermined deceleration set on the basis of a pseudo vehicle body deceleration calculated from detected road wheel velocities, an electronic control unit (ECU) suspends a pressure increase control such as to increase a brake liquid pressure of the road wheel corresponding one of wheel cylinders and executes such a pressure hold control as to hold the brake liquid pressure thereof.

19 Claims, 14 Drawing Sheets

ANTI-SKID CONTROL SYSTEM AND METHOD FOR AUTOMOTIVE VEHICLE

BACKGROUND OF THE INVENTION (1) Field of the Invention

The present invention relates generally to anti-skid control system and method for an automotive vehicle which can prevent each of road wheels from being locked by performing cyclical pressure increase and decrease controls of a brake liquid pressure during the braking of a wheel cylinder equipped on each of the road wheels of the automotive vehicle and, more particularly, techniques adopted in the anti-skid control system and method such as a small sizing of a liquid pressure pump equipped in the anti-skid control system for a circulation of a working liquid and a suppression of vibration due to an excessive drive of the liquid pressure pump.

(2) Description of the Related Art

A Japanese Patent Application First Publication No. Heisei 7-117653 published on May 9, 1995 exemplifies a previously proposed brake liquid pressure controlling apparatus.

In the previously proposed brake liquid pressure controlling apparatus, in accordance with a correlation between a pseudo vehicle body velocity and each road wheel velocity, namely, in accordance with a road wheel slip rate of each road wheel, a pressure increase or decrease control for the road wheel corresponding wheel cylinder is carried out so that such a slip rate suppression control that each or any one of the road wheels does not exceed a predetermined value (so-called, a control target velocity) is carried out to prevent the occurrence of the corresponding road wheel's lock.

Since a maximum road wheel velocity from among the respective wheel velocities of the road wheels is approximated to an actual vehicle body velocity, this maximum road wheel velocity is used for a control purpose as a pseudo vehicle body velocity. However, the maximum wheel velocity may probably be calculated at a value higher than an actual vehicle body velocity due to the slips of some road wheels, an unnecessary pressure reduction control of the brake liquid pressure is started so that a brake insufficient state of the vehicle may occur if the pseudo vehicle body velocity based on the maximum road wheel velocity is directly used. Hence, an offset value toward a lower vehicle velocity side is set to the vehicle body velocity based on the maximum road wheel velocity. It is common practice that the pseudo vehicle body velocity set toward a lower value by the velocity reduction side offset value than the pseudo vehicle body velocity based on the maximum road wheel velocity is used for an anti-skid control purpose.

However, since, in the previously proposed brake liquid pressure controlling apparatus described above, the pseudo vehicle body velocity which is set to the lower value by the offset quantity toward the lower velocity side than the pseudo vehicle body velocity based on the maximum road wheel velocity, the control target velocity (so-called, a threshold value determining a start of the pressure decrease control) of the road wheel velocities generated on the basis of the pseudo vehicle body velocity is also set to be the lower value. Thus, since the pressure increase control is acted upon even when the road wheel velocity becomes deeper (or lower) than an ideal road wheel velocity with respect to the actual vehicle body velocity, the pressure increase becomes excessive. Hence, during the subsequent pressure decrease control, the increase in the pressure increase quantity, i.e., a quantity (consumed liquid quantity) of the brake liquid circulated toward a master cylinder side from a reservoir along with a discharge of a relatively excessive quantity of brake liquid from the wheel cylinder to the reservoir. A liquid pressure pump having a larger capacity is required and a cost of installing the anti-skid control system becomes expensive and a large sizing of the whole system is brought out. In addition, due to a frequent operation of the liquid pressure pump, a performance of a sound suppression in the liquid pressure pump and a brake piping system can be worsened.

SUMMARY OF THE INVENTION

It is, therefore, an object of the present invention to provide anti-skid control system and method for an automotive vehicle which enable a whole reduction in a consumed liquid quantity of a working liquid.

According to one aspect of the present invention, there is provided an anti-skid control system for an automotive vehicle, comprising: a brake unit to adjust a brake liquid pressure of a wheel cylinder installed on each road wheel of the vehicle, the brake unit being enabled to form any one of a pressure increase state, a pressure decrease state, and a pressure hold state in each wheel cylinder; a wheel velocity detecting section that detects wheel velocities of the respective road wheels; a pseudo vehicle body velocity calculating section that calculates a pseudo vehicle body velocity on the basis of the detected road wheel velocities of the respective road wheels; a road wheel deceleration calculating section that calculates a deceleration of each of the road wheels; a vehicle body deceleration calculating section that calculates a pseudo vehicle body deceleration from the calculated pseudo vehicle body velocity; and a brake control unit that, when any one of the wheel velocities of the respective road wheels has reached to a target velocity derived on the basis of the pseudo vehicle body velocity, forms the pressure decrease state of the brake unit to execute such a pressure decrease control as to carry out a decrease in pressure of the brake liquid of any one of the wheel cylinders which corresponds to one of the road wheels whose detected wheel velocity has reached to the target velocity and, thereafter, when the calculated wheel deceleration of the corresponding one of the road wheels becomes equal to or below zero, forms the pressure increase state of the brake unit to execute such a pressure increase control as to carry out an increase in pressure of the brake liquid of the corresponding one of the wheel cylinders, the brake control unit suspending the pressure increase control and executing such a pressure hold control as to hold the brake liquid pressure of the road wheel corresponding one of the wheel cylinders when the calculated wheel deceleration of the corresponding one of the road wheels has reached to a predetermined deceleration set on the basis of the vehicle body deceleration.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

(First Embodiment)

Figure 1:
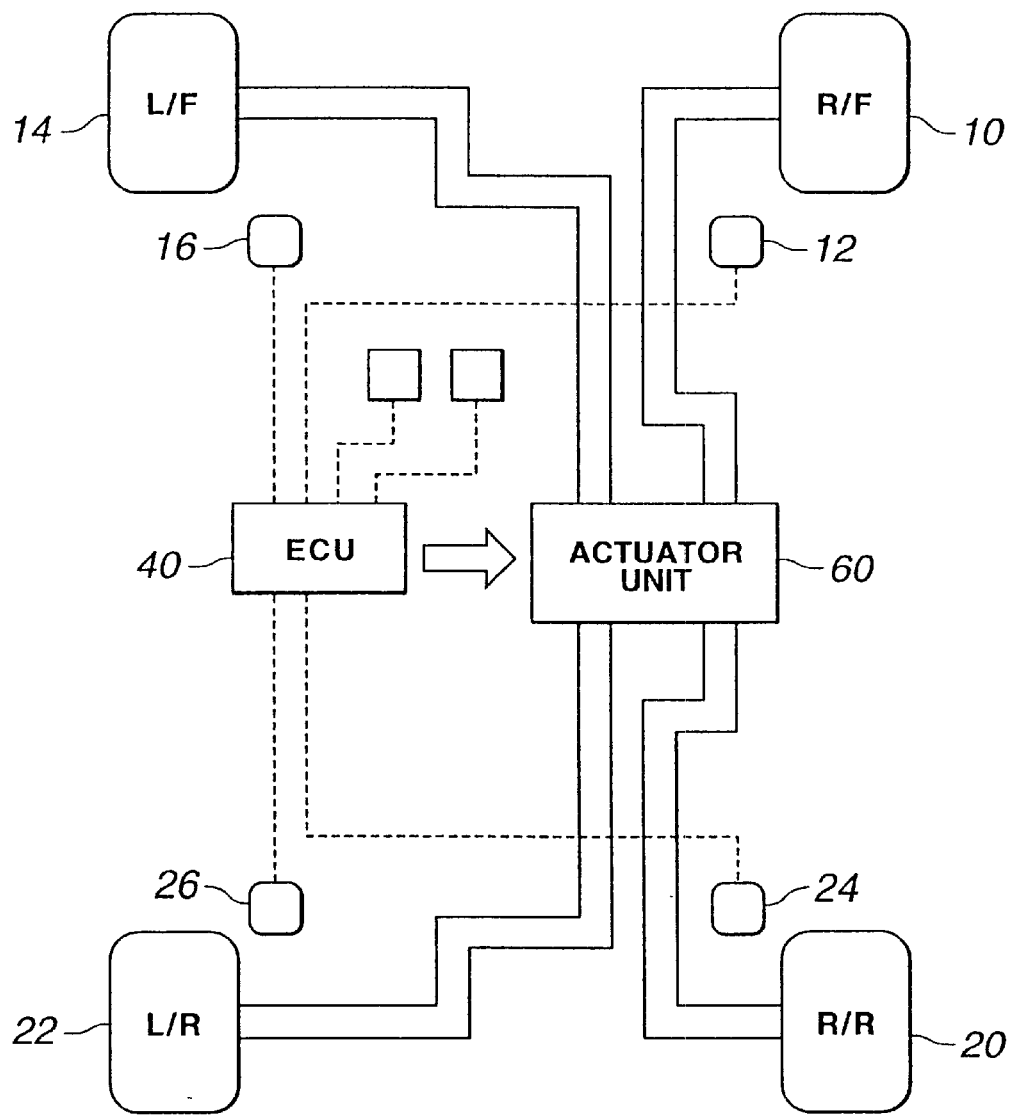
FIG. 1 is a system configuration of an anti-skid control system in a first preferred embodiment according to the present invention.

FIG. 1 shows a system configuration of an anti-skid control system in a first preferred embodiment according to the present invention.

In FIG. 1, an automotive vehicle includes a front tight road wheel 10, a front left road wheel 14, a rear right road wheel 20, and a rear left road wheel 22. A plurality of wheel velocity sensors 12, 16, 24, and 26 are disposed on the respectively corresponding road wheels 10, 14, 20, and 22 to output pulse train signals representing revolutions of the corresponding road wheels. These pulse train signals are supplied to an electronic control unit (hereinafter, ECU) including a CPU (Central Processing Unit). The front right and left road wheels 10 and 14 are non-driven wheels and the rear right and left road wheels 20 and 22 are driven wheels, in this embodiment.

Figure 2:
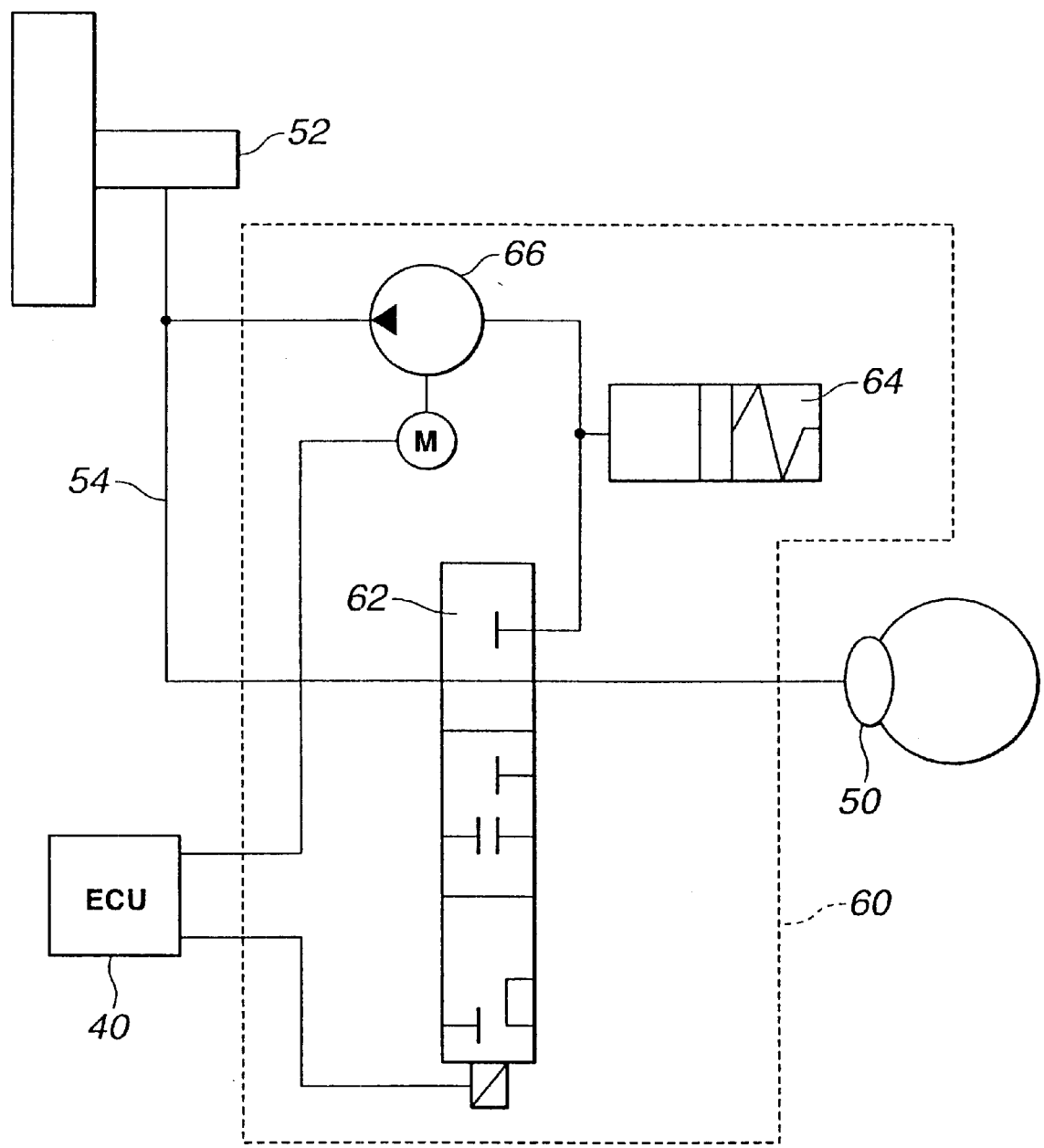
FIG. 2 is a schematic block diagram of a brake liquid pressure circuit in the anti-skid control system shown in FIG. 1.

FIG. 2 shows a system configuration view of a brake liquid pressure circuit applicable to the anti-skid control system in the first embodiment shown in FIG. 1.

The brake liquid pressure circuit shown in FIG. 2 includes: wheel cylinders (or, so-called, braking cylinders) 50 disposed on the respective road wheels; a master cylinder 52 which develops the brake liquid pressure in accordance with a depression by a vehicle driver; and a main liquid passage (liquid pressure tubular passage) 54 which communicates each of the wheel cylinders 50 with master cylinder 52. An actuator unit 60 is intervened in a midway through the main liquid passage 54 to control the brake liquid pressure of each of the wheel cylinders 50. The actuator unit 60 includes: a switch control valve 62 to switch a control state in either the control increase or decrease in the liquid pressures of the corresponding one of the respective wheel cylinder 50; a reservoir 64 in which the brake liquid of the corresponding one of the wheel cylinders 50 is reserved during the pressure decrease; and a liquid pressure pump 66 which returns the brake liquid reserved in the reservoir 64 to the main liquid passage 54.

Figure 3:
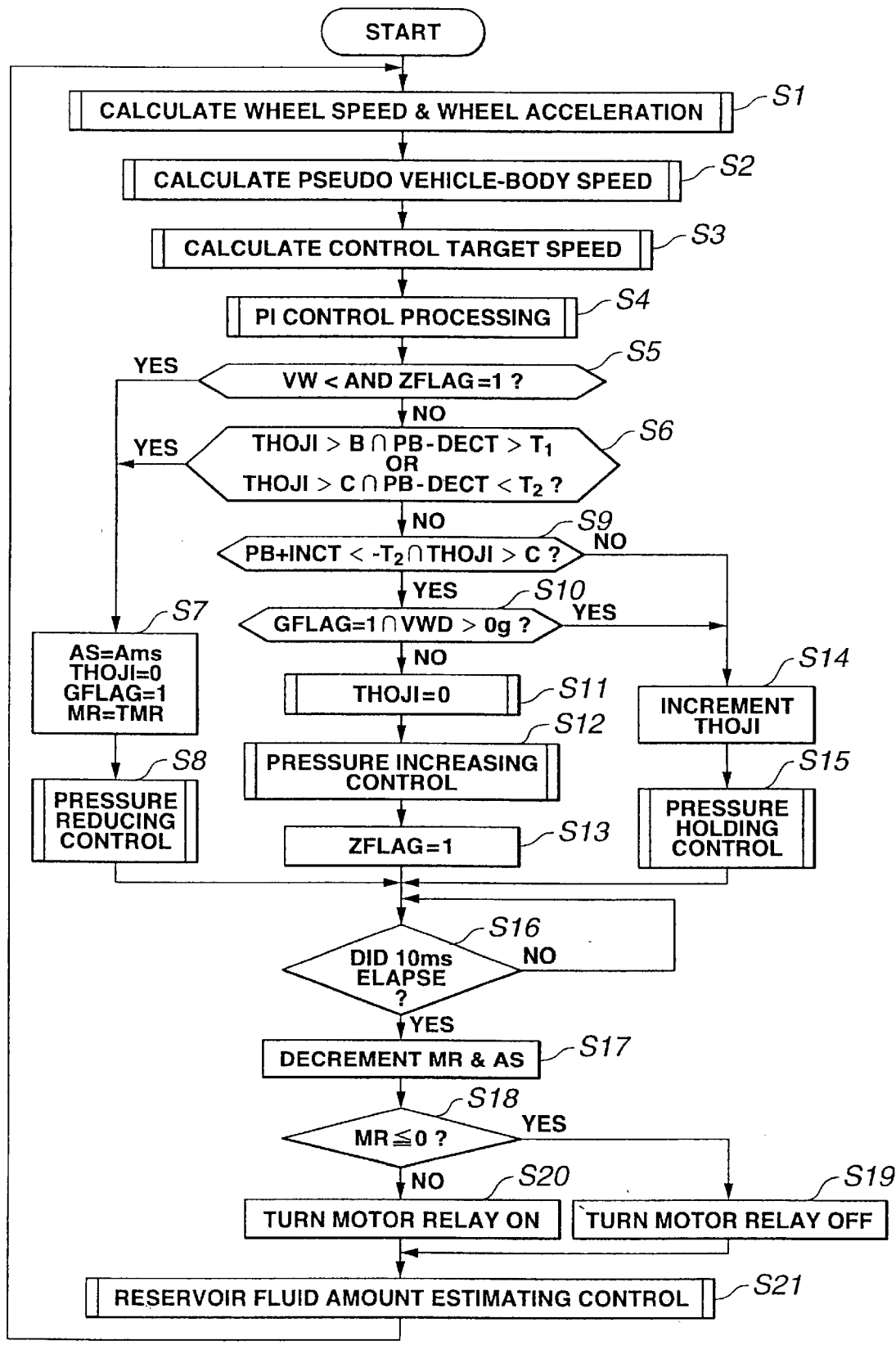
FIG. 3 is a basic flowchart of an anti-skid control procedure executed by an ECU in the anti-skid control system shown in FIG. 1.

Next, a basic control procedure of the anti-skid control system executed by ECU 40 will be described below with reference to a control flowchart shown in FIG. 3 (FIG. 3 corresponds to brake controlling means including pressure increase control inhibiting means).

At a step S1, ECU 40 calculates respective road wheel velocities VW of the front right and left road wheels 10 and 16 and the rear right and left road wheels 24 and 26 in accordance with the outputted pulse train signals from the wheel velocity sensors 12, 16, 24, and 26 and calculates respective wheel accelerations VWD by differentiating the respectively corresponding wheel velocities VW. At a step S2, ECU 40 calculates a pseudo vehicle velocity, namely, a pseudo vehicle body velocity VI from each wheel velocity VW calculated at step S1. The detailed content of step S2 will be described later in flowcharts shown in FIGS. 4 and 5.

At a step S3, ECU 40 calculates a control target velocity VWS (pressure decrease determination threshold value) from pseudo vehicle body velocity VI calculated at step S2. It is noted that the contents of the calculation on the control target velocity VWS will be described later with reference to a flowchart of FIG. 6.

At the next step S4, ECU 40 calculates a PI (Proportional-Integration) control arithmetic and logic operation process. In details, ECU 40 calculates a target pressure increase-decrease pulse time duration PB representing a control time duration of a target brake liquid and a deceleration offset value OFF_VIK which is an offset value of a threshold value to inhibit the brake liquid increase pressure control. It is noted that the contents of the PI arithmetic operation process at step S4 will be described in details later with reference to a flowchart in FIG. 7.

At the next step S5, ECU 40 determines if any one of the wheel velocities VW of the respective road wheels calculated at step S1 is lower than the control target velocity VWS calculated at step S3 and a flag ZFLAG indicating that the pressure increase for the corresponding one of the wheel cylinders 50 is carried out (the flag indicating that the pressure increase control is being executed) is set to "1". If Yes (VW<VWS and ZFLAG=1) at step S5, the routine goes to a step S7 for preparing the pressure decrease control.

At step S7, EGU 40 performs such a process as listed below and, thereafter, the routine goes to a step S8. At step S8, ECU 40 carries out the brake liquid pressure decrease control procedure (brake liquid pressure decrement control). The processes to be executed at step S7: 1) Set a pressure decrease control performance time duration AS to a predetermined time A; 2) reset a hold control time duration TH0JI to "0"; and 3) set a pressure decrease execution flag GFLAG to "1".

At step S8, ECU 40 carries out the brake pressure decrease control procedure. That is to say, FCU 40 outputs a switch signal to switch control valve 62 of actuator unit 60 so that master cylinder 52, corresponding wheel cylinder 50, and reservoir 64 are communicated with one another.

On the other hand, if the determination at step S5 is No (viz., VW≧VWS, or ZFLAG=0), the routine goes to a step S6. At step S6, ECU 40 determines whether a necessity of the brake liquid pressure decrease control is present, specifically, whether a hold control time duration THOJI is in excess of a predetermined time B msec. and target pressure increase·decrease pulse time duration PB− pressure decrease time duration timer value DECT is in excess of a predetermined time of T1 msec. (T1<B), the hold control time duration THOJI is in excess of a predetermined time C msec. (B<C), or a time duration of the pressure decrease time timer value DECT subtracted from the target pressure increase·decrease pulse duration PB is in excess of a predetermined time of T2 msec. (T2<T1). If either one of the two conditions is established (Yes) at step S6, the routine goes to step S7.

In addition, if the determination at step S6 is No (neither one nor the other condition is established) at step S6, the routine goes to a step S9 in order to determine whether the pressure increase or hold control of the brake liquid pressure is needed. Specifically, EGU 40 determines whether the time of the value of the pressure increase time timer INCT subtracted from the target pressure increase·decrease pulse time PB is shorter than a predetermined time of −T2 msec. and the hold control time duration THOJI is in excess of C msec. If the determination at step S9 is Yes (both conditions are established), ECU 40 determines that both wheels are not yet slipped and the routine goes to a step S10.

At step S10, ECU 40 determines whether a pressure decrease execution flag GFLAG (a flag indicating that the pressure decrease control is being executed) is set to "1" and the wheel acceleration VWD is in excess of 0 g. If No (at least one of the two conditions is not established) at step S10, the routine goes to a step S11 since the liquid pressure in the corresponding wheel cylinder 50 tends to be insufficient. At step S11, hold control time duration THOJI is reset to "0". Thereafter, the routine goes to a step S12 at which the pressure decrease control (brake liquid pressure increment control) is executed.

At step S10, ECU 40 determines if pressure decrease execution flag GFLAG is set to "1" and determines whether any one of the wheel accelerations is in excess of 0 g.

If No (PB+INCT≦−T2 msec. or THOJI≦C msec.) at step S9 or Yes (GFLAG=0 or VWD≦VIK+OFF_VIK) at step S10, the routine goes to a step S14.

As described above, at step S12, ECU 40 carries out the brake liquid pressure increase control. That is to say, in this case, the switch control valve 62 of the actuator unit 60 is driven so that master cylinder 52 and the related wheel cylinder 50 are linked to one another. At the next step S13, pressure increase control execution flag ZFLAG is set to "1".

At step S14, ECU 40 increments the hold control time duration THOJI and, thereafter, the routine goes to a step S15 at which the brake liquid pressure hold control for the corresponding wheel cylinder 50 is carried out.

At step S15, ECU 40 carries out the brake liquid pressure hold control. That is to say, in this case, the switch control valve 62 is driven at a position at which the corresponding wheel cylinder 50 interrupts the communication to the master cylinder 52 and reservoir 64.

If any one of steps S8, S13, and S15 is executed, the routine goes to step S16. At step S16, ECU 40 determines whether 10 milliseconds have passed. If not longer than 10 milliseconds (No), the determination at step S16 is repeated until indicating Yes. If 10 milliseconds have passed (Yes), the routine goes to a step S17. At step S17, the pressure decrease control execution time AS is decremented and the routine returns to step S1. As described above, the above-described routine of FIG. 3 is executed for 10 millisecond.

Next, the detailed contents of step S2 shown in FIG. 3, viz., the pseudo vehicle body velocity calculation process will be described with reference to a flowchart of FIG. 4.

At a step S21, ECU 40 sets a maximum value of the four wheel velocities VW as a wheel velocity select value VFS and, thereafter, the routine goes to a step S22.

At a step S22, ECU 40 determines whether the non-pressure decrease control is being carried out depending on whether pressure decrease control execution time duration AS is zero. If Yes (under the non-pressure decrease control) at step S22, the routine goes to a step S23. At step S23, after the maximum value of the wheel velocities of VW of the non-driven wheels as wheel velocity select value VFS, the routine goes to a step S24. If NO (the pressure decrease control is being executed with AS≠0), the routine goes directly to a step S24.

At step S24, ECU 40 determines whether pseudo vehicle body velocity VI is equal to or higher than the wheel velocity select value VFS. If Yes (VI≧VFS) at step S24, the routine goes to a step S25. At step S25, ECU 40 determines pseudo vehicle body velocity VI during the vehicle deceleration from the following equation and the present flow of FIG. 4 is ended. That is to say, VI=VI−VIK x k. In this equation, VIK denotes a vehicle body deceleration. The contents of calculation of the vehicle body deceleration VIK will be described later with reference to a flowchart of FIG. 5.

If VI<VFS (No) at step S24, ECU 40 determines that the vehicle is being accelerated and the routine goes to a step S26. At step S26, ECU 40 sets a deceleration limiter constant x to 2 Km/h and the routine goes to a step S27. At step S27, ECU 40 determines whether the present time is under the non-pressure decrease control depending on whether the pressure decrease control execution time AS indicates zero. If Yes (AS=0) at step S27, the routine goes to a step S28. At step S28, the deceleration limiter constant is set to 0.1 Km/h (x←0.1 (Km/h)) and, thereafter, the routine goes to a step S29. If No (AS≠0 and the pressure decrease control is being executed) at step S27, the routine jumps from step S27 to step S29. At step S29, ECU 40 determines the pseudo vehicle body velocity VI from the following equation and the present once flow is ended: VI=VI+x.

Next, a specific content of the vehicle body deceleration calculation used at step S25 of FIG. 4 will be described with reference to a flowchart shown in FIG. 5.

At a step S251, ECU 40 determines whether the control state is switched from the non-pressure decrease control state (AS=0) to the pressure decrease control state (AS≠0). If Yes at step S251, the routine goes to a step S252. At step S252, EGU 400 sets the vehicle velocity when the pressure decrease control is first carried out, viz., a pressure decrease control start vehicle velocity VO to pseudo vehicle body velocity VI and resets a timer TO for generating the vehicular deceleration to "0". Then, the routine goes to a step S253. In addition, if No (non-pressure decrease control is being executed) (AS=0)) at step S251, the routine jumps to step S253. After the vehicle deceleration generation timer TO is incremented, the routine goes to a step S254.

At a step S254 (spin up determination), ECU 40 determines whether the wheel velocity select value VFS is returned to pseudo vehicle body velocity VI. If Yes (VI<VFS→VU≧VFS) at step S254, the routine goes from step S254 to step S255. At step S255, ECU 40 determines vehicle body deceleration VIK using the following equation and the routine goes to a step S256. If No at step S254 (VI<VFS), the routine jumps to step S256. That is to say, VIK=(VO−VI)/TO.

At step S256, ECU40 determines whether the vehicle is running on a road surface having a low frictional coefficient, viz., the pressure decrease time DECT is equal to or longer than D msec. If Yes (DECT≧D msec.=low μ road surface) at step S256, the routine goes to a step S257 at which a low μ flag LouF is set to "1". Then, the present once flow is ended. If No (DECT<D msec.=a high μ road surface at step S256, the present once flow is directly ended.

Figure 6:
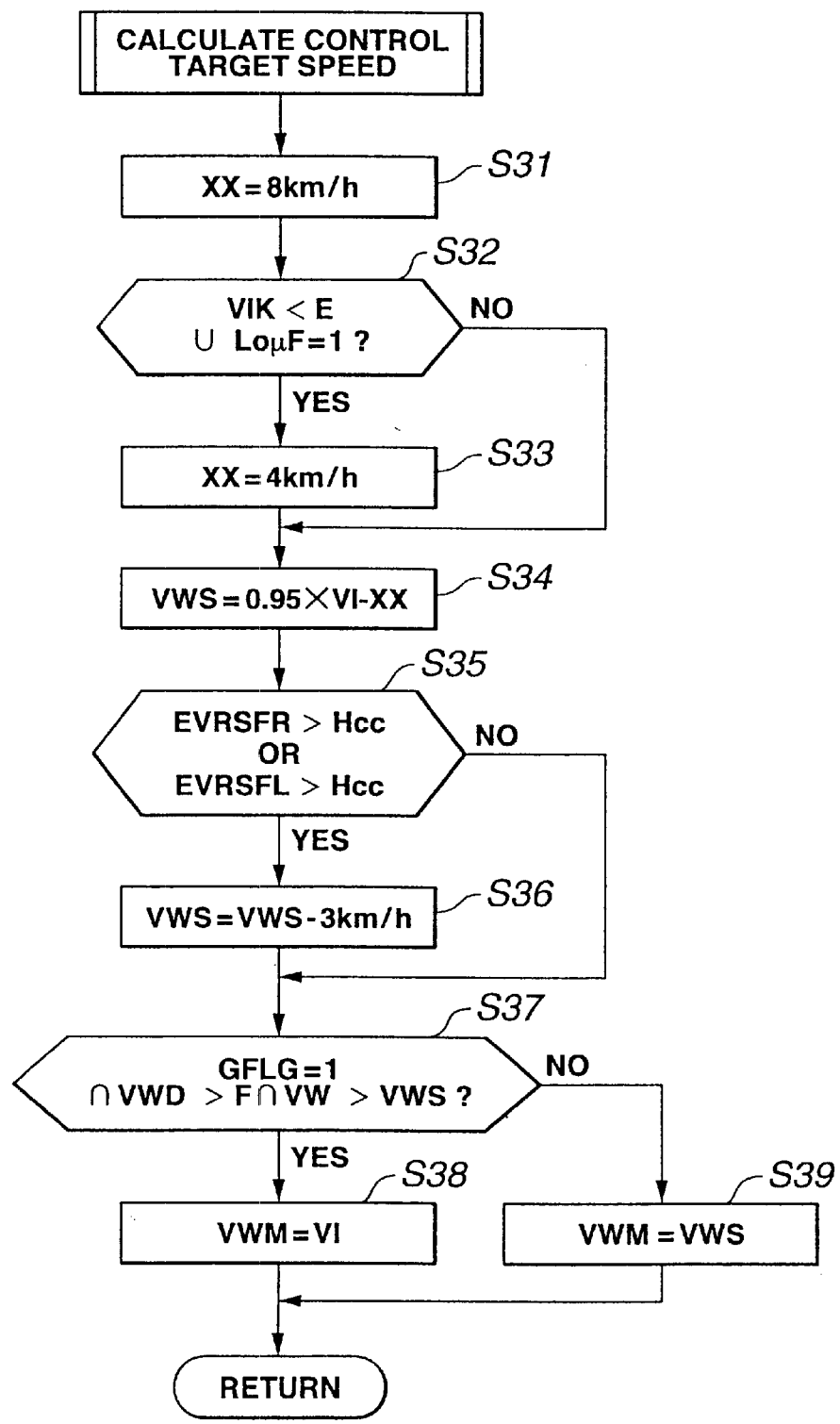
FIG. 6 is an operational flowchart representing the contents of a vehicle body deceleration calculation executed in the ECU shown in FIG. 1.

Next, a specific detailed content of the control target velocity calculation at step S3 shown in FIG. 3 will be described with reference to a flowchart shown in FIG. 6.

At a step S31, ECU 40 sets an offset value XX of control target velocity VWS to, first of all, 8 Km/h and, thereafter, the routine goes to a step S32.

At step S32, ECU 40 determines whether the vehicle body deceleration is lower than a predetermined value E and the low μ flag LouF is set to "1" so as to determine whether the vehicle is running on the road surface having the low fictional coefficient (low μ). If Yes at step S32 (the vehicle is running on the low μ road surface), the routine goes to a step S33. At step S33, the offset value XX is modified to 4 Km/h and the routine goes to a step S34. On the other hand, if No (the vehicle is running on the high μ road surface, the routine goes directly to step S34 (the offset value of XX is left unchanged as XX=8 Km/h).

Figure 4:
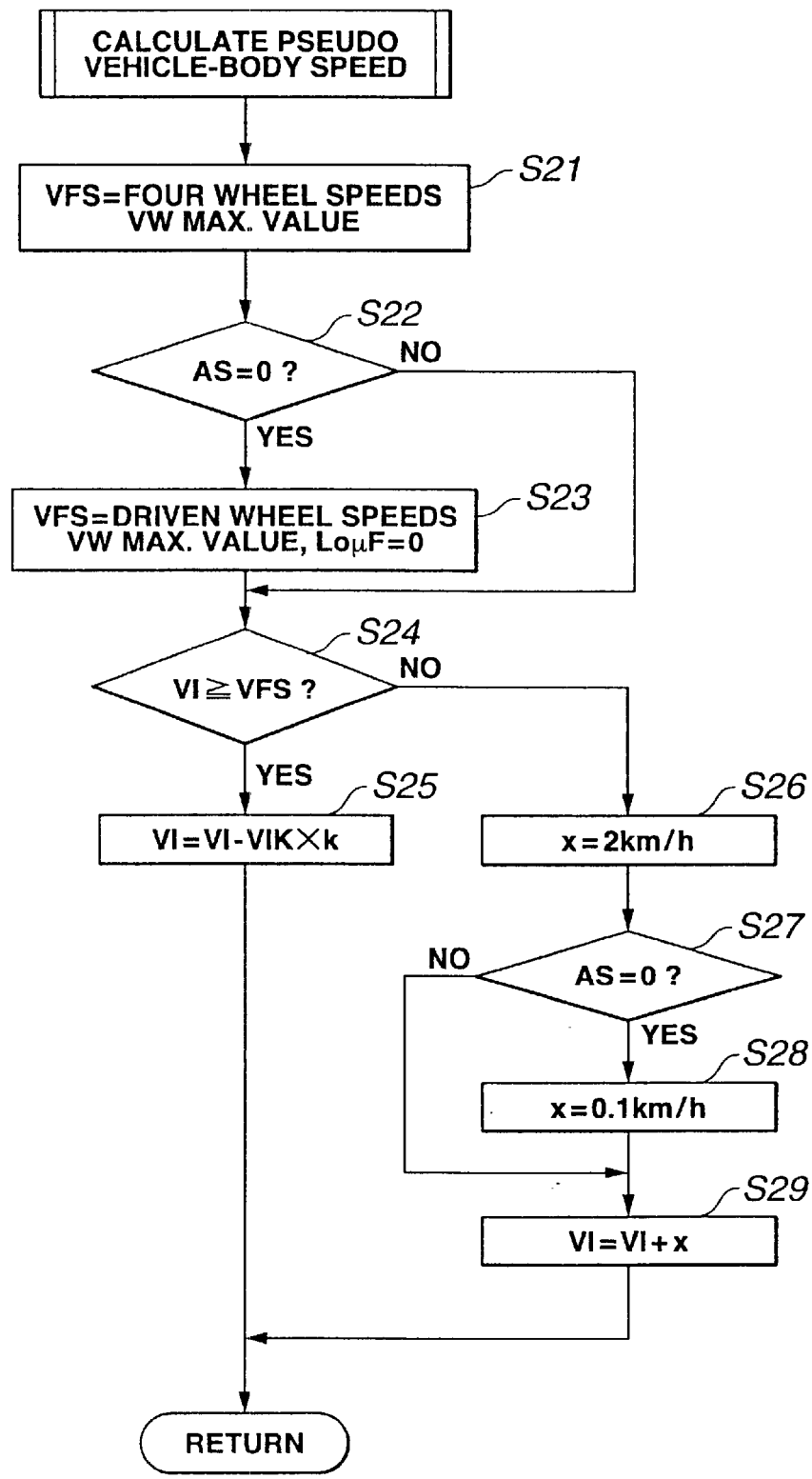
FIG. 4 is an operational flowchart representing the contents of a pseudo vehicle body velocity calculation in the ECU of the anti-skid control system shown in FIG.
Figure 5:
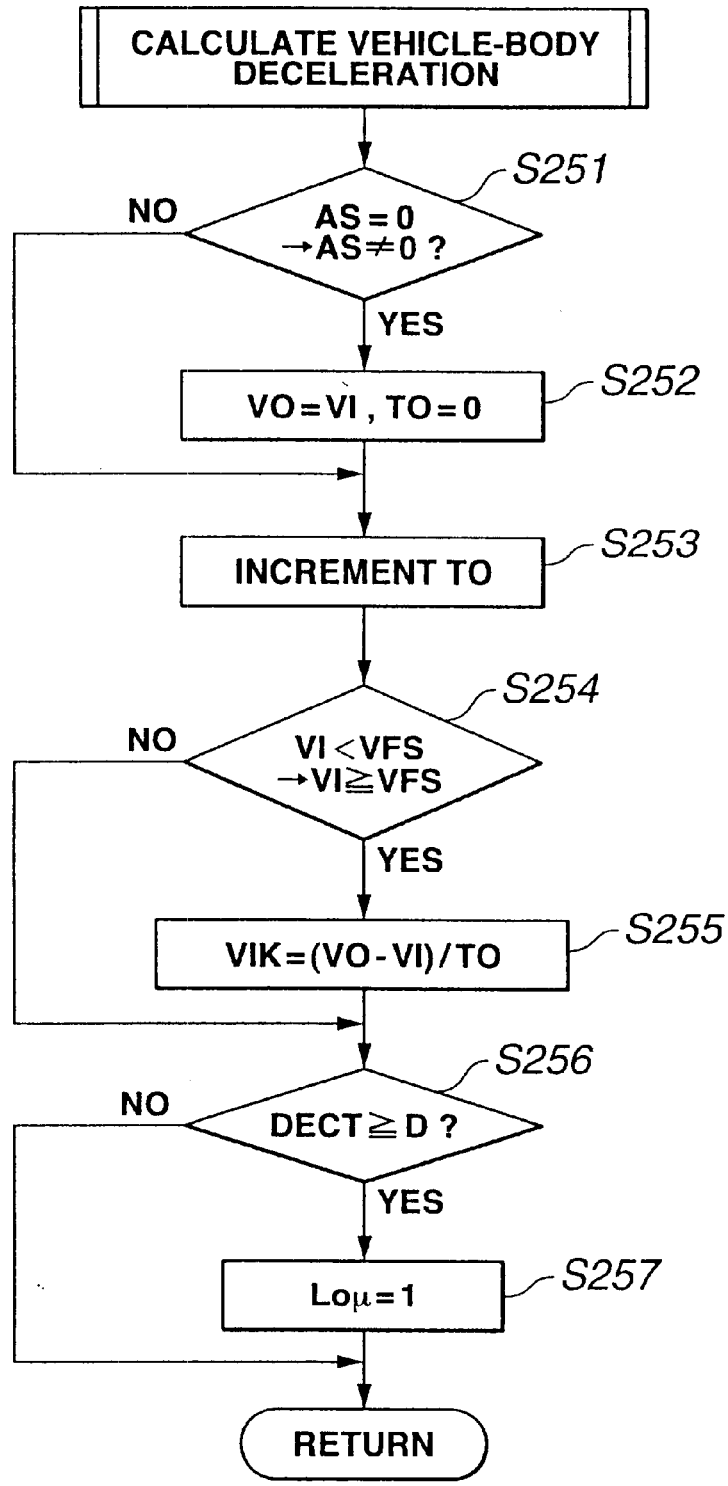
FIG. 5 is an operational flowchart representing the contents of a vehicle body deceleration calculation executed in the ECU shown in FIG. 1.

At step S34, ECU 40 calculates the control target velocity VWS on the basis of the following equation from the pseudo vehicle body velocity VI calculated at the flowchart of FIG. 4 and the offset value of XX and, thereafter, the routine goes to a step S35. That is to say, VWS=0.95x VI−XX.

At step S35, ECU 40 determines whether the pressure decrease flag GFLAG is set to "1", the wheel acceleration VWD is in excess of the predetermined value of F, and, furthermore, the wheel velocity VW is in excess of the control target velocity VWS. If Yes at step S35, the routine goes to a step S36. At step S36, ECU 40 sets a target slip vehicle velocity VWM to the pseudo vehicle body velocity VI. If No at step S35, the routine goes to a step@ S37. At step S37, ECU 40 sets the target slip vehicle velocity VWM to the control target velocity VWS. Then, the present once flow is ended.

Next, a specific detailed content of the PI control arithmetic and logic operation process at step S4 shown in FIG. 3 will be described below with reference to a flowchart of FIG. 7.

First, at a step S41, ECU 40 calculates a deviation ΔVW on the basis of the following equation: ΔVW=VWM−VW.

Next, at a step S42, ECU 40 determines a proportional coefficient PP from the following equation: PP=KP xΔVW.

At the next step S43, ECU 40 derives an integration coefficient IP of the PI control from the following equation: IP=IP 100 millisecond before+KI xΔVW, wherein KI denotes a coefficient.

At the next step S44, ECU 40 derives a target pressure increase·decrease pulse time PB from the following equation: PB=PP+IP.

At the next step S45, ECU 40 determines whether an added value of OFF_VIK of the offset value of the deceleration to the vehicle body deceleration VIK is lower than the wheel acceleration −VWD. If Yes (VIK+OFF_VIK<−VWD) at step S45, the routine goes to a step S46. At step S46, ECU 40 resets the target pressure increase·decrease pulse time PB to "0". Thus, a process of inhibiting the pressure increase control is carried out and, thereafter, the routine goes to a step S47. In addition, if No (VIK+OFF_VIK≧−VWD) at step S46, the routine goes directly to step S47. At step S47, ECU40 sets the deceleration offset value OFF_VIK to a value of the deceleration offset value OFF_VIK before 100 milliseconds added to 0.1 g and, thereafter, the present once flow is ended.

Figure 8:
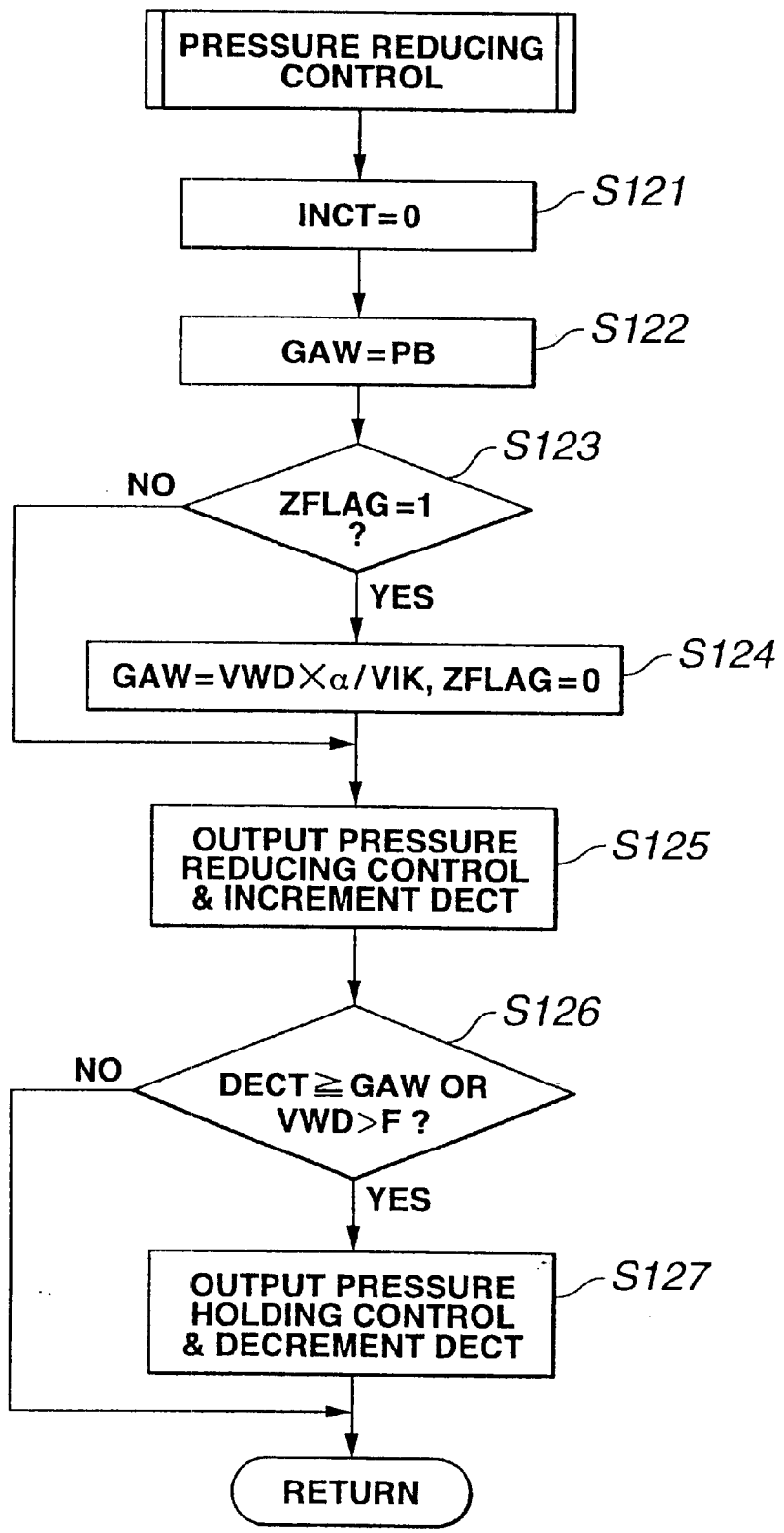
FIG. 8 is an operational flowchart representing the contents of the pressure decrease control executed in the ECU shown in FIG. 1.

Next, a specific detailed content of the pressure decrease control carried out at step S12 of FIG. 3 will be described below with reference to a flowchart of FIG. 8.

At a step S121, the ECU 40 resets a pressure increase time counter INCT to "0" and, at a step S122, the ECU 40 sets a pressure decrease pulse time GAW to target pressure increase·decrease pulse time PB and the routine goes to a step S123.

At a step S123, ECU 40 determines whether pressure decrease execution flag ZFLAG is set to "1".

If Yes (ZFLAG=1) at a step S123, the routine goes to a step S124. At step S124, ECU 40 derives pressure decrease pressure pulse time GAW from following equation: GAW= VWD xα/VIK, wherein a denotes a coefficient. After pressure increase execution flag ZFLAG is reset to "0" at step S124, the routine goes to a step S125. In addition, if No (ZFLAG=0) at step S123, the routine jumps to step S125. At step S125, ECU 40 carries out a port pressure decrease output process. After pressure decrease time timer DECT is incremented, the routine goes to a step S126.

At step S126, ECU 40 determines whether pressure decrease time timer DECT is equal to or longer than pressure decrease pulse time GAW or whether wheel acceleration VWD is in excess of the predetermined value of F. If Yes (DECT≧GAW, or VWD>F) at step S126, the routine goes to a step S127. At step S127, ECU 40 carries out the hold control output and decrements pressure decrease time timer DECT. Then, the present once flow is ended. If No (DECT<GAW and VWD≦F) at step S126, the present once flow is directly ended.

Next, a specific detailed content of step S15 (pressure hold control) shown in FIG. 3 will be described below with reference to a flowchart of FIG. 9.

At a step S151, ECU 40 resets pressure decrease time counter DECT to "0" and, at the next step S152, ECU 40 sets pressure increase pulse time duration ZAW to target pressure increase·decrease pulse time PB and the routine goes to a step S153. That is to say, at step S45 of the PI control calculation procedure shown in FIG. 7, if ECU 40 determines that the added value between vehicle body deceleration VIK and deceleration offset value OFF_VIK is smaller than wheel acceleration −VWD, the routine shown in FIG. 7 goes to step S46 at which target pressure increase·decrease pulse time PB is reset to zero. Therefore, under this state, since pressure increase pulse time ZAW at step S152 is set to PB (=0), a pressure increase control is inhibited.

At the next step S153, ECU 40 determines whether pressure decrease execution flag GFLAG is set to "1". If Yes (GFLAG=1) at step S153, the routine goes to a step S154. At step S154, ECU 40 sets the deceleration offset value OFF_VIK to 0.1 g. Then, the routine goes to a step S155. At step S155, ECU 40 derives pressure increase pulse time duration ZAW from the following equation: ZAW=VWD xβ/VIK, wherein β denotes a coefficient. After pressure decrease execution flag GFLAG is reset to zero, the routine goes to a step S156. If No (GFLAG=0), the routine goes directly to step S156.

At step S156, ECU 40 carries out the port pressure increase output process and the increment of pressure increase time counter INCT. Then, the routine goes to a step S157.

At step S157, ECU 40 determines whether pressure increase time timer INCT is equal to or longer than pressure increase time ZAW. If Yes (INCT≧ZAW) at step S157, the routine goes to a step S158. At step S158, ECU 40 carries out the port hold output process and decrements pressure increase time counter INCT and the present once flow is ended. If No (INCT<ZAW) at step S157, the present once flow is ended.

Next, operation and advantage of the anti-skid control system in the first embodiment will be described below with reference to FIGS. 10 and 11.

The structure of the anti-skid control system in the first embodiment according to the present invention has been described with reference to FIGS. 1 through 9. ECU 40 executes the pressure decrease control such that switch control valve 62 is switched to the pressure decrease control state so as to decrease the pressure of the liquid pressure of wheel cylinder 50, thus weakening the brake pressure since there is an increased tendency of the wheel lock when each of wheel velocities VW of respective wheels 10, 14, 20, and 21 detected by wheel velocity sensors 12, 16, 24, and 26 is lower than control target velocity VWS derived from pseudo vehicle body velocity VI. The execution of the pressure decrease control causes each of wheel velocities VW to be changed from the deceleration direction to the acceleration direction and to prevent the wheel lock from being occurred.

Thereafter, the execution of the above-described pressure decrease control causes the wheel acceleration to be decreased and to be equal to or lower than zero. At this time, switch control valve 62 is switched into the pressure increase control state so that such the pressure increase control that the liquid pressure of wheel cylinder 50 is increased. Hence, the braking force is strengthened and a development of the insufficient state of the deceleration of the vehicle body is prevented.

In addition, if wheel acceleration VWD becomes equal to or larger than the deceleration which is the addition of vehicle body deceleration VIK to deceleration offset value OFF_VIK, the pressure increase control is inhibited and the hold control such that the liquid pressure of wheel cylinder 50 is held at its output pressure is executed.

That is to say, if wheel acceleration VWD is in the deceleration direction with respect to vehicle body deceleration VIK, there is no ill effect on the anti-skid control even if the pressure increase control is inhibited. Hence, if the extra pressure increase control is positively inhibited in such a situation as described above, the consumed liquid quantity of the whole working liquid can be reduced. Hence, since the capacity of liquid pressure pump 66 can be reduced, it becomes possible to reduce the cost and the small sizing of the whole system. In addition, since the working time of liquid pressure control valve 66, the vibration present of low pressure pump 66 and the brake piping system can be improved.

As described above, since the wheel acceleration value which serves as a criterion of determining a start of the pressure increase is set to the added value of the vehicle body deceleration velocity VIK to deceleration offset value OFF_VIK, the pressure increase control is inhibited at an earlier timing so as to enable the entrance of control into the hold control even if, for example, due to an influence of a disturbance input of noises, the vehicle body deceleration such as VIK is calculated at a relatively lower value. Then, a drop in the deceleration and a development in the insufficient acceleration can be generated.

In addition, while the addition value of vehicle body deceleration VIK and deceleration offset value OFF_VIK is lower than wheel acceleration −VWD, deceleration offset value OFF_VIK to be added to the vehicle body deceleration VIK is set to be increased by 0.1 g for each 100 millisecond. Then, action and advantages can be achieved in the following: FIG. 10 shows a timing chart representing an operation of the anti-skid control system in the first embodiment in a case where deceleration offset value OFF_VIK is fixed to a constant value and FIG. 11 shows a timing chart representing the contents of operation in the anti-skid control system in the first embodiment according to the present invention in which deceleration offset value OFF_VIK is gradually increased.

Figure 10:
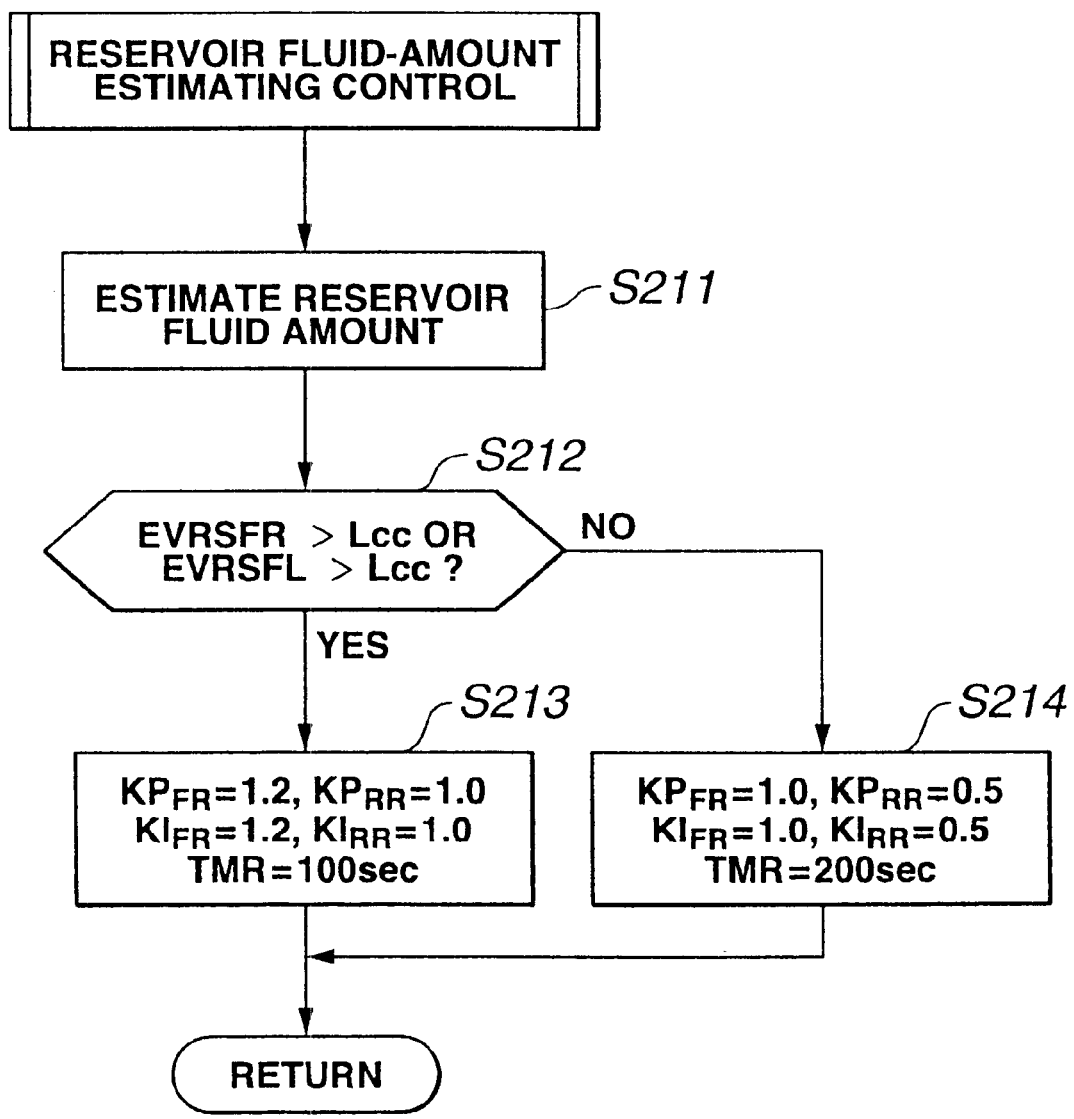
FIG. 10 is a timing chart representing an anti-skid control operation in a case where the offset value is fixed to a constant value.

That is to say, for example, when the running road surface is transferred from low $\mu$ road surface to high $\mu$ road surface and deceleration offset value OFF_VIK is fixed to the constant value, as shown in FIG. 10, the wheel acceleration VWD is changed to the decrease direction as compared with vehicle body deceleration VIK. Hence, if is difficult to start the pressure increase control so that a delay in the rise of the deceleration occurs and a braking distance becomes longer.

Figure 11:
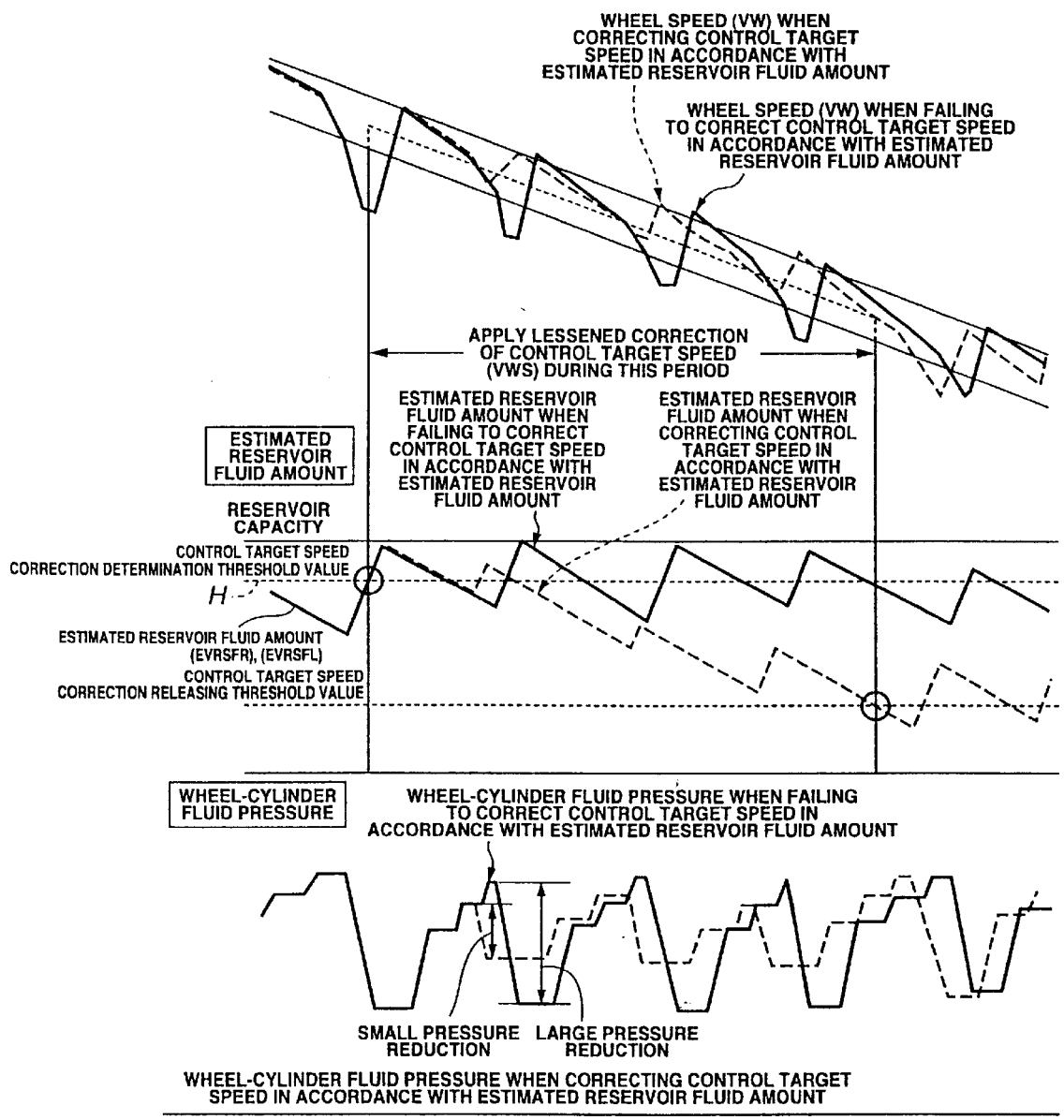
FIG. 11 is a timing chart representing the control contents of the ECU executed in the anti-skid control system in the first embodiment.

On the other hand, as shown in FIG. 11, while the addition value between vehicle body deceleration VIK and the added value of deceleration offset value OFF_VIK is lower than wheel acceleration −VWD, deceleration offset value OFF_VIK to be added to vehicle body deceleration VIK is set to be gradually increased. Hence, even if the running road surface is transferred from low $\mu$ road surface to high $\mu$ road surface and wheel acceleration VWD is changed to the decrease direction as compared with vehicle body deceleration VIK. Hence, a smooth rise in the deceleration can be achieved since a region in which a gradual pressure increase is possible becomes large. Thus, the braking distance can be shortened in a case where the frictional state of the road surface on which the vehicle is running is changed from low $\mu$ road surface into high $\mu$ road surface.

(Second Embodiment)

Next, a second preferred embodiment of the anti-skid control system according to the present invention will be described below. If is noted that the same reference numerals used in the second embodiment as those described in the first embodiment designate the like elements and the detailed description of these elements will herein be omitted.

In the anti-skid control system in the second embodiment, when any one of the respective wheel velocities VW derived from corresponding road wheels 10, 14, 20, and 22 is lower than control target velocity VWS derived from pseudo vehicular body velocity VI, switch control valve 62 is switched into the pressure decrease control state and the pressure decrease control is executed such that the liquid pressure of the wheel cylinder is decreased. Thereafter, when wheel acceleration VWD is equal to or lower than zero, switching control valve 62 is switched to the pressure increase state to execute the pressure increase control such as to increase the liquid pressure of wheel cylinder 50. Furthermore, if wheel velocity VW is equal to a hold control determination velocity λB obtained by adding pseudo vehicle body velocity VI to predetermined offset value LBPFS, switching control valve 62 is switched to the hold control state with the pressure increase control suspended so that the hold control such as to hold the liquid pressure of wheel cylinder 50 is executed. Then, in the setting of hold control determination velocity λB, offset value LBOFS to be added to pseudo vehicle body velocity VI is gradually increased. That is to say, parts of the contents of the flowcharts of the anti-skid control system in the first embodiment are different from those in the case of the second embodiment.

Figure 7:
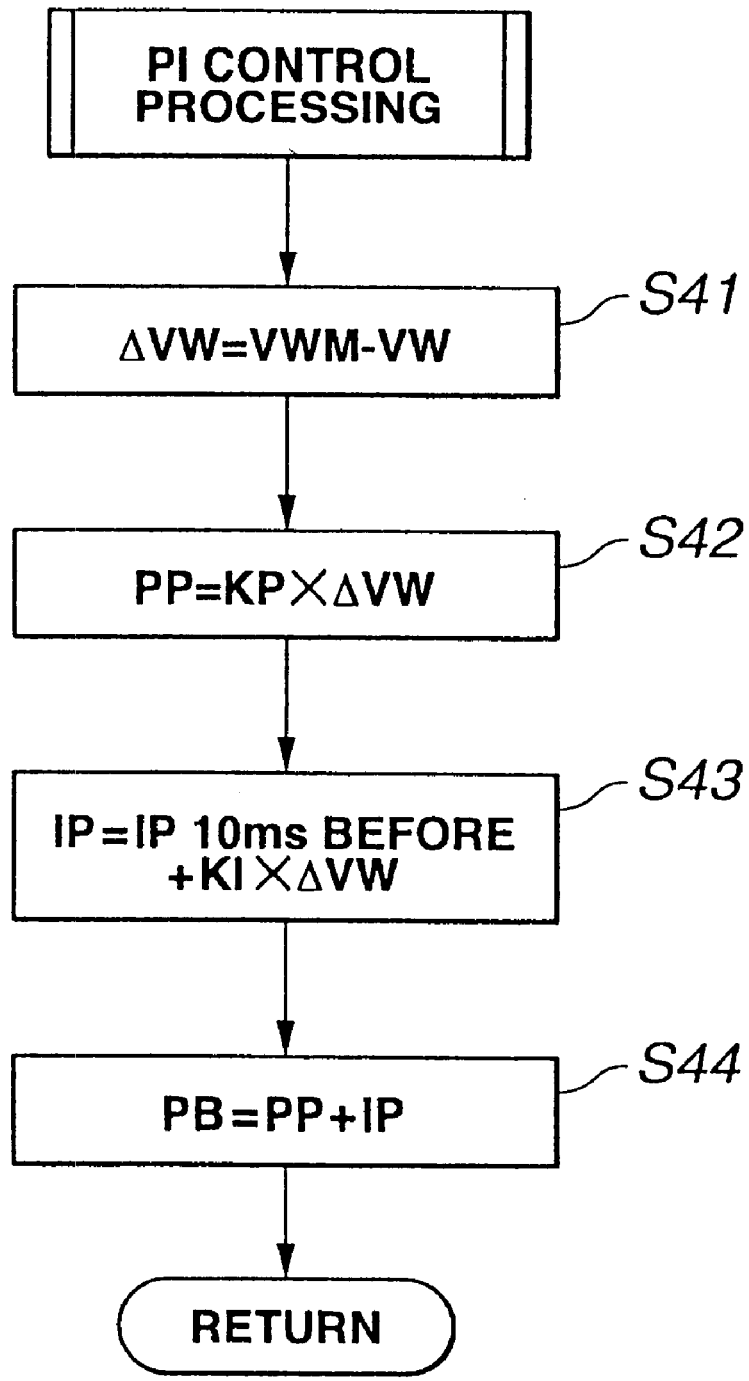
FIG. 7 is an operational flowchart representing the contents of a PI control arithmetic and logic operations executed in the ECU shown in FIG. 1.
Figure 12:
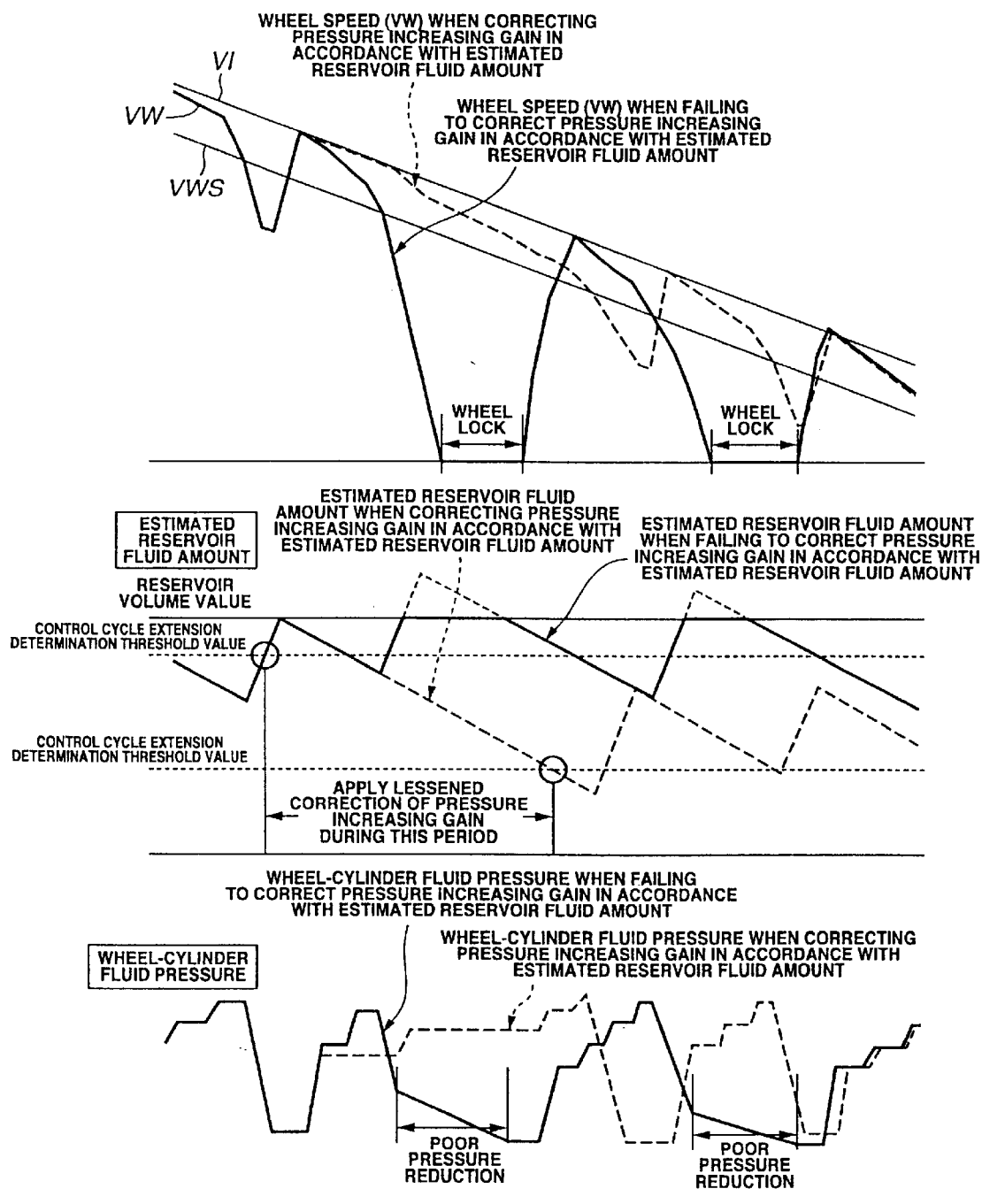
FIG. 12 is an operational flowchart representing the contents of the PI control arithmetic operation from among the control contents of the ECU of the anti-skid control system in a second preferred embodiment according to the present invention.

FIG. 12 shows a flowchart of the detailed contents of the PI control arithmetic and logic operations shown in FIG. 7 described in the first embodiment. The contents of steps of S45 and S47 are different from those in the case of the first embodiment.

That is to say, at a step S45-1 shown in FIG. 12, ECU 40 determines if wheel velocity VW is lower than hold control determination velocity λB and wheel velocity VW is equal to or higher than control target velocity VWS. If Yes (VW<λB and VW≧VWS), the routine goes to step S46. At step S46, ECU 40 sets target pressure increase·decrease pulse time PB to zero and the routine goes to a step S47-1. If No at step S45-1, the routine goes directly goes to step S47-1.

At step S47-1, ECU 40 sets offset value LBOFS to a value of offset value LBOFS before 100 milliseconds added to 0.1 Km/h and the routine goes to a step S47-2. At step S47-2, ECU 40 derives the hold control determination velocity λB from the following equation and the present once flow is ended. λB=0.95x VI-LBOFS.

Figure 9:
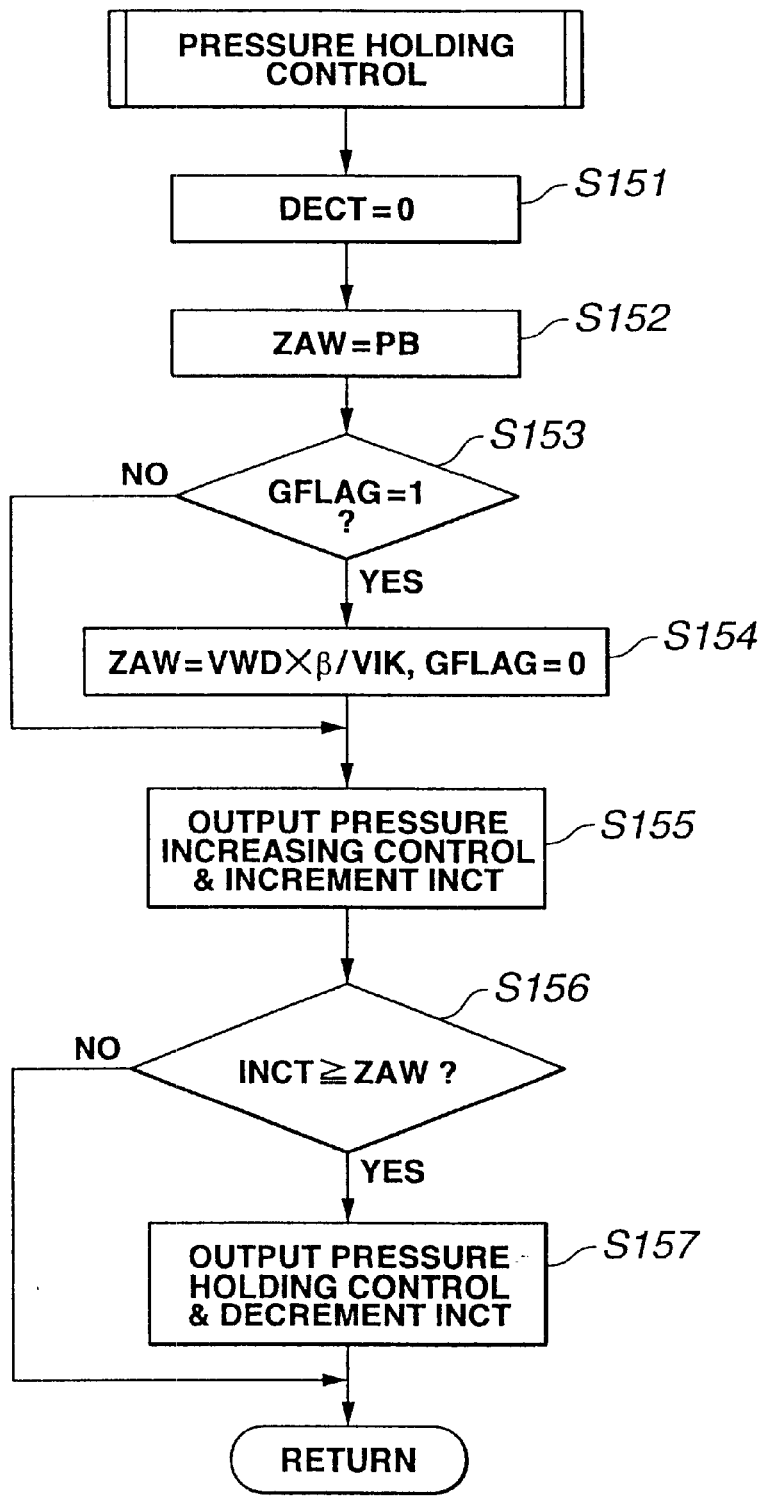
FIG. 9 is an operational flowchart representing the contents of pressure hold and increase controls executed in the ECU shown in FIG. 1.
Figure 13:
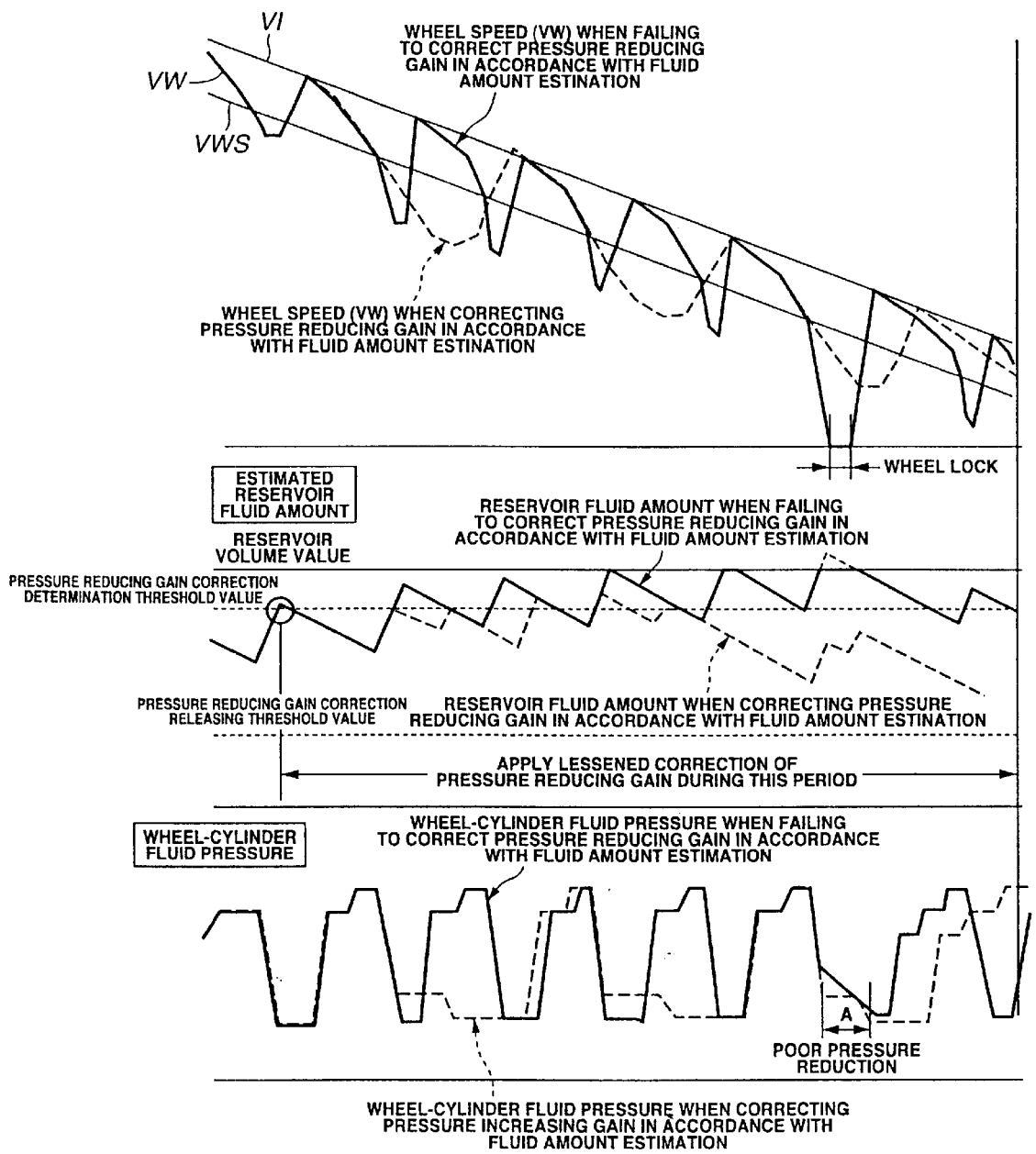
FIG. 13 is an operational flowchart representing the PI control arithmetic and logic operation in the ECU in the anti-skid control system in the second embodiment according to the present invention.

Next, FIG. 13 shows the operational flowchart representing the contents of the pressure increase control corresponding to FIG. 9 described in the first embodiment. The difference point is that the contents of a step S154 shown in FIG. 13.

That is to say, if the determination at step S153 indicates Yes (GFLAG=1), the routine goes to a step S154-1 at which the offset value of LBOFS is set to "0" and, thereafter, advances to step S155.

Figure 14:
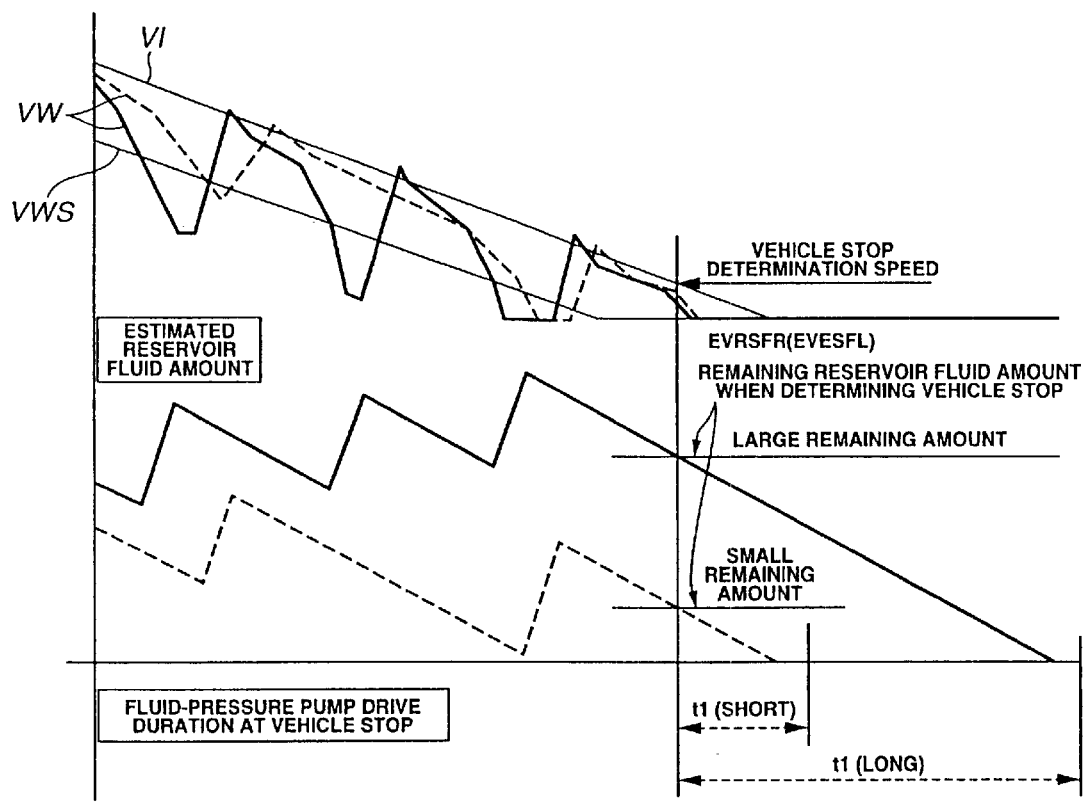
FIG. 14 is a timing chart representing the control contents in the ECU of the anti-skid control system in the second preferred embodiment according to the present invention.

Next, operation and advantage in the case of the second embodiment of the anti-skid control system according to the present invention will be described below with reference to FIG. 14.

When each of wheel velocities VW becomes lower than hold control determination velocity λB derived by adding pseudo vehicle body velocity VI to predetermined offset value LBOFS, switch control valve 62 is switched into the hold control state with the pressure increase control suspended so that such the hold control that the liquid pressure of wheel cylinder 50 is held. Hence, an extra pressure increase control is actively inhibited so that the whole consumed liquid quantity of the working liquid can be decreased. Hence, since the capacity of the liquid pressure pump 66 can be reduced, the reduction in cost and the small sizing of the system become possible and the drive time of liquid pressure pump 66 becomes short. Hence, the sound vibration performance of liquid pressure pump 66 and the brake piping system can be improved.

In addition, in the setting of hold control determination velocity ?B, offset value LBOFS to be added to pseudo vehicle body velocity VI is set to be gradually increased at a gradient of 0.1 Km/h for each 100 millisecond. Hence, the following advantages can be obtained.

In details, for example, suppose that, in a case where the running road surface is transferred from low μ road surface to high μ road surface. At this time, when the offset value LBOFS is fixedly set at the constant value, wheel acceleration VWD is first changed in the decrease direction as compared with vehicle body deceleration VIK. Hence, the pressure increase control is made difficult to be started, thus the delay in the rise in the deceleration being resulted to occur and the braking distance being elongated. Whereas, as shown in FIG. 14, offset value LBOFS is set so as to be gradually increased. At this time, even if the running road surface is transferred from the low μ road surface to the high μ road surface and wheel acceleration VWD is changed in the direction at which the value of VWD is decreased as compared with vehicle body deceleration VIK, the region in which the gradual pressure increase is possible is enlarged. Hence, the quick rise in the deceleration can be achieved. Thus, the braking distance in a case where the road surface change of the frictional coefficient from the low μ road surface to the high μ road surface occurs. In addition, since the brake efficiency during the execution of the pressure increase inhibit control becomes relatively high, the braking performance can become favorable.

As described above, the embodiments of the anti-skid control system according to the present invention have been described with reference to the accompanying drawings. Various types of design modifications can be made without departing from the scope and sprit of the present invention.

The entire contents of a Japanese Patent Application No. 2001-080263 (filed in Japan on Mar. 21, 2001) are herein incorporated by reference. The scope of the invention is defined with reference to the following claims.

What is claimed is:

1. An anti-skid control system for an automotive vehicle, comprising:

a brake unit to adjust a brake liquid pressure of a wheel cylinder installed on each road wheel of the vehicle, the brake unit being enabled to form any one of a pressure increase state, a pressure decrease state, and a pressure hold state in each wheel cylinder;

a wheel velocity detecting section that detects wheel velocities of the respective road wheels;

a pseudo vehicle body velocity calculating section that calculates a pseudo vehicle body velocity on the basis of the detected road wheel velocities of the respective road wheels;

a road wheel deceleration calculating section that calculates a deceleration of each of the road wheels;

a vehicle body deceleration calculating section that calculates a pseudo vehicle body deceleration from the calculated pseudo vehicle body velocity; and a brake control unit that, when any one of the wheel velocities of the respective road wheels has reached to a target velocity derived on the basis of the pseudo vehicle body velocity, forms the pressure decrease state of the brake unit to execute such a pressure decrease control as to carry out a decrease in pressure of the brake liquid of any one of the wheel cylinders which corresponds to one of the road wheels whose detected wheel velocity has reached to the target velocity and, thereafter, when the calculated wheel deceleration of the corresponding one of the road wheels becomes equal to or below zero, forms the pressure increase state of the brake unit to execute such a pressure increase control as to carry out an increase in pressure of the brake liquid of the corresponding one of the wheel cylinders, the brake control unit suspending the pressure increase control and executing such a pressure hold control as to hold the brake liquid pressure of the road wheel corresponding one of the wheel cylinders when the calculated wheel deceleration of the corresponding one of the road wheels has reached to a predetermined deceleration set on the basis of the vehicle body deceleration.

2. An anti-skid control system for an automotive vehicle as claimed in claim 1, wherein, the predetermined deceleration is set to an addition value of the pseudo vehicle body deceleration to a predetermined offset value.

3. An anti-skid control system for an automotive vehicle as claimed in claim 2, wherein the predetermined offset value is gradually increased in accordance with time.

4. An anti-skid control system for an automotive vehicle as claimed in claim 1, further comprising a first determinator to determine whether the wheel velocity (VW) of any one of the road wheels is lower than the predetermined control target velocity (VWS) and whether the pressure increase control for the corresponding one of the wheel cylinders is being executed (ZFLAG=1) and wherein the brake control unit sets a pressure decrease control execution time (AS) to a predetermined time (A), resets a hold control time duration (THOJI) to zero and sets a pressure decrease execution flag (GFLAG) to "1" to indicate the execution of the pressure decrease control and the b brake control unit executes the pressure decrease control when the first determinator determines that the wheel velocity (VW) of the corresponding one of the road wheels is lower than a control target velocity (VWS) and the pressure increase control for the corresponding wheel cylinder is being executed (ZFLAG=1).

5. An anti-skid control system for an automotive vehicle as claimed in claim 4, further comprising a second determinator to determine whether a hold control time duration (THOJI) is equal to or higher than a first predetermined time (B) and a value of a subtraction of the pressure decrease time counter (DECT) from a target pressure increase·decrease pulse time duration (PB) is longer than a second predetermined time (T1) or to determine whether the hold control time duration (THOJI) is longer than a third predetermined time (C) and the value of the subtraction of the pressure decrease time timer (DECT) from the target pressure increase·decrease pulse time duration (PB) is longer than a fourth predetermined time (T2) and wherein B<C and T2<T1 when the first determinator determines that the wheel velocity (VW) of each road wheel is equal to or higher than the control target velocity (VWS) and the pressure increase control is not being executed.

6. An anti-skid control system for an automotive vehicle as claimed in claim 5, further comprising a third determinator to determine whether an added value of the target pressure increase·decrease pulse time duration (PB) with a timer value of a pressure increase control time duration (INCT) is shorter than a minus fourth predetermined time (-T2) and the hold control time duration (THOJI) is longer than the third predetermined time (C) when the second determinator determines that THOJI$\leq$B and PB−DECT$\leq$T1 or determines that THOJI$\leq$C and PB−DECT$\leq$T2.

7. An anti-skid control system for an automotive vehicle as claimed in claim 6, further comprising a fourth determinator to determine whether the pressure decrease control is being executed and a wheel acceleration (VWD) is in excess of 0 g when the third determinator determines that PB+INCT<−T2 and THOJI>C.

8. An anti-skid control system for an automotive vehicle as claimed in claim 7, wherein, when the fourth determinator determines that either a non-execution of the pressure decrease control or the wheel acceleration (VWD) which is not in excess of 0 g, the brake unit is driven to switch the controlled state of the brake liquid pressure of the corresponding one of the wheel cylinders into the pressure increase control state in which a master cylinder is communicated with the corresponding one of the respective wheel cylinders.

9. An anti-skid control system for an automotive vehicle as claimed in claim 7, wherein, when the third determinator determines that PB+INCT$\geq$−T2 or THOJI$\leq$C and the fourth determinator determines that the pressure decrease control is being executed and the wheel acceleration (VW) is in excess of 0 g, the brake unit is driven to switch the controlled state of the liquid pressure of the corresponding one of the wheel cylinders into the hold control state in which the corresponding one of the wheel cylinders is interrupted from communications with a master cylinder and a reservoir.

10. An anti-skid control system for an automotive vehicle as claimed in claim 9, wherein, when the first determinator determines that VW<VWS and the pressure increase control is being executed or when the second determinator determines that THOJI>B and PB−DECT>T1 or determines that THOJI>C and PB−DECT>T2, the brake unit is driven to switch a control state of the liquid pressure of the corresponding one of the wheel cylinders into the pressure increase control state in which the corresponding one of the wheel cylinders is communicated with the master cylinder and the reservoir.

11. An anti-skid control system for an automotive vehicle as claimed in claim 3, wherein the brake control unit resets a pressure decrease time counter (DECT) to zero (DECT=0), sets a pressure increase pulse time duration (ZAW) to a pressure increase·decrease pulse time duration (PB) (ZAW= PB), sets the predetermined offset value (OFF_VIK) to a constant value of 0.1 g (OFF_VIK=0.1 g) when the pressure decrease control is being executed, and resets the pressure increase·decrease pulse time duration (PB) to zero when an added value of the pseudo vehicle body deceleration (VIK) with the predetermined offset value of the deceleration is lower than the predetermined wheel acceleration (−VWD).

12. An anti-skid control system for an automotive vehicle as claimed in claim 1, wherein, when the corresponding one of the calculated wheel velocities has reached to the predetermined threshold value which corresponds to a hold control determination velocity ($\lambda$B) obtained by adding the pseudo vehicle body velocity calculated by the pseudo vehicle body velocity calculating section to a predetermined offset value (LBOFS), the brake control unit suspends the pressure increase control for the corresponding one of the wheel cylinders to be executed and holds the liquid pressure for the corresponding one of the wheel cylinders, the predetermined offset value being gradually increased in accordance with time.

13. An anti-skid control system for an automotive vehicle as claimed in claim 12, wherein the brake control unit suspends the pressure increase control for the corresponding one of the wheel cylinders to be executed and holds the liquid pressure for the corresponding one of the wheel cylinders when the corresponding one of the wheel velocities (VW) is lower than the hold control determination velocity ($\lambda$B) and the corresponding one of the wheel velocities is equal to or higher than the predetermined control target velocity (VWS).

14. An anti-skid control system for an automotive vehicle as claimed in claim 13, wherein the predetermined offset value (LBOFS) is gradually increased as follows: LBOFS= LBOFS (LBOFS before 100 milliseconds)+0.1 Km/h.

15. An anti-skid control system for an automotive vehicle as claimed in claim 13, wherein the hold control determination velocity ($\lambda$B) is set as follows: $\lambda$B=0.95×VI−LBOFS, wherein VI denotes the pseudo vehicle body velocity.

16. An anti-skid control system for an automotive vehicle as claimed in claim 13, wherein the brake control unit resets a pressure decrease time counter (DECT) to zero (DECT=0), sets a pressure increase pulse time duration (ZAW) to a pressure increase·decrease pulse time duration (PB) (ZAW= PB), zeroes the predetermined offset value (LBOFS=0) when the pressure decrease control is being executed, and resets the pressure increase·decrease pulse time duration (PB) to zero when the corresponding one of the wheel velocities (VW) is lower than the hold control determination velocity (λB) and the corresponding one of the wheel velocities (VW) is equal to or higher than a control target velocity (VWS) derived from the pseudo vehicle body velocity (VI).

17. An anti-skid control system for an automotive vehicle, comprising:

a brake unit to adjust a brake liquid pressure of a wheel cylinder installed on each road wheel of the vehicle, the brake unit being enabled to form any one of a pressure increase state, a pressure decrease state, and a pressure hold state in each wheel cylinder;

a wheel velocity detecting section that detects wheel velocities of the respective road wheels;

a pseudo vehicle body velocity calculating section that calculates a pseudo vehicle body velocity on the basis of the detected road wheel velocities of the respective road wheels;

a road wheel deceleration calculating section that calculates a deceleration of each of the road wheels;

a vehicle body deceleration calculating section that calculates a pseudo vehicle body deceleration from the calculated pseudo vehicle body velocity; and a brake control unit that, when any one of the wheel velocities of the respective road wheels has reached to a target velocity derived on the basis of the pseudo vehicle body velocity, forms the pressure decrease state of the brake unit to execute such a pressure decrease control as to carry out a decrease in pressure of the brake liquid of any one of the wheel cylinders which corresponds to one of the road wheels whose detected wheel velocity has reached to the target velocity and, thereafter, when the calculated wheel deceleration of the corresponding one of the road wheels becomes equal to or below zero, forms the pressure increase state of the brake unit to execute such a pressure increase control as to carry out an increase in pressure of the brake liquid of the corresponding one of the wheel cylinders, the brake control unit suspending the pressure increase control and executing such a pressure hold control as to hold the brake liquid pressure of the road wheel corresponding one of the wheel cylinders, when the detected wheel velocity of the corresponding one of the road wheels has reached to a hold threshold value derived by adding the pseudo vehicle body velocity to a predetermined offset quantity, and the offset quantity being gradually increased in accordance with time.

18. An anti-skid control system for an automotive vehicle, comprising:

braking means for adjusting a brake liquid pressure of a wheel cylinder installed on each road wheel of the vehicle, the braking means being enabled to form any one of a pressure increase state, a pressure decrease state, and a pressure hold state in each wheel cylinder;

wheel velocity detecting means for detecting wheel velocities of the respective road wheels;

pseudo vehicle body velocity calculating means for calculating a pseudo vehicle body velocity on the basis of the detected road wheel velocities of the respective road wheels;

road wheel deceleration calculating means for calculating a deceleration of each of the road wheels;

vehicle body deceleration calculating means for calculating a pseudo vehicle body deceleration from the calculated pseudo vehicle body velocity; and brake controlling means, when any one of the wheel velocities of the respective road wheels has reached to a target velocity derived on the basis of the pseudo vehicle body velocity, for forming the pressure decrease state of the braking means to execute such a pressure decrease control as to carry out a decrease in pressure of the brake liquid of any one of the wheel cylinders which corresponds to one of the road wheels whose detected wheel velocity has reached to the target velocity and, thereafter, when the calculated wheel deceleration of the corresponding one of the road wheels becomes equal to or below zero, for forming the pressure increase state of the braking means to execute such a pressure increase control as to carry out an increase in pressure of the brake liquid of the corresponding one of the wheel cylinders, the brake controlling means suspending the pressure increase control and executing such a pressure hold control as to hold the brake liquid pressure of the road wheel corresponding one of the wheel cylinders when the calculated wheel deceleration of the corresponding one of the road wheels has reached to a predetermined deceleration set on the basis of the vehicle body deceleration.

19. An anti-skid control method for an automotive vehicle, comprising:

providing a brake unit to adjust a brake liquid pressure of a wheel cylinder installed on each road wheel of the vehicle, the brake unit being enabled to form any one of a pressure increase state, a pressure decrease state, and a pressure hold state in each wheel cylinder;

detecting wheel velocities of the respective road wheels;

calculating a pseudo vehicle body velocity on the basis of the detected road wheel velocities of the respective road wheels;

calculating a deceleration of each of the road wheels;

calculating a pseudo vehicle body deceleration from the calculated pseudo vehicle body velocity;

when any one of the wheel velocities of the respective road wheels has reached to a target velocity derived on the basis of the pseudo vehicle body velocity, forming the pressure decrease state of the brake unit to execute such a pressure decrease control as to carry out a decrease in pressure of the brake liquid of any one of the wheel cylinders which corresponds to one of the road wheels whose detected wheel velocity has reached to the target velocity;

when the calculated wheel deceleration of the corresponding one of the road wheels becomes equal to or below zero, forming the pressure increase state of the brake unit to execute such a pressure increase control as to carry out an increase in pressure of the brake liquid of the corresponding one of the wheel cylinders; and when the calculated wheel deceleration of the corresponding one of the road wheels has reached to a predetermined deceleration set on the basis of the vehicle body deceleration, suspending the pressure increase control and executing such a pressure hold control as to hold the brake liquid pressure of the road wheel corresponding one of the wheel cylinders.

* * * * *

UNITED STATES PATENT AND TRADEMARK OFFICE
CERTIFICATE OF CORRECTION

PATENT NO. : 6,776,462 B2
DATED : August 17, 2004
INVENTOR(S) : Inoue et al.

It is certified that error appears in the above-identified patent and that said Letters Patent is hereby corrected as shown below:

Title page,
Item [*] Notice, delete "by 144 days" and insert -- by 263 days --.

Signed and Sealed this

First Day of November, 2005

JON W. DUDAS
*Director of the United States Patent and Trademark Office*